United States Patent

Endo

[11] Patent Number: 5,804,928
[45] Date of Patent: Sep. 8, 1998

[54] PICTURE DISTORTION CORRECTION APPARATUS

[75] Inventor: Morio Endo, Takatsuki, Japan

[73] Assignee: Matsushita Electronics Corporation, Osaka, Japan

[21] Appl. No.: 754,770

[22] Filed: Nov. 20, 1996

[30] Foreign Application Priority Data

Nov. 21, 1995 [JP] Japan .................................. 7-303099

[51] Int. Cl.⁶ .............................. H01J 29/70; H01J 29/76
[52] U.S. Cl. ........................................... 315/400; 315/371
[58] Field of Search ..................................... 315/400, 371

[56] References Cited

U.S. PATENT DOCUMENTS

| | | |
|---|---|---|
| 3,681,725 | 8/1972 | Ikeuchi .................................. 335/227 |
| 3,806,853 | 4/1974 | KiKuchi ................................. 335/210 |
| 4,084,115 | 4/1978 | Peer ....................................... 315/371 |
| 4,321,511 | 3/1982 | Willis . |
| 4,563,618 | 1/1986 | Haferi . |
| 4,642,530 | 2/1987 | Rodriguez-Cavazos ................ 315/371 |

*Primary Examiner*—Theodore M. Blum
*Attorney, Agent, or Firm*—Panitch Schwarze Jacobs & Nadel, P.C.

[57] ABSTRACT

Series connected first to fourth reactor coils are wound on a core and connected in series with a horizontal deflection coil. A coil is also wound on the core and connected in series with a vertical deflection coil. The core is provided with two permanent magnets and magnetic bias is applied to the first to fourth reactor coils. A total inductance of first to fourth reactor coils is controlled by a vertical deflection current passing through the coil, and thereby, a correction amount of an amplitude of a horizontal deflection current is changed.

12 Claims, 15 Drawing Sheets

$I_y(H) = 0$
$I_y(V) = \text{Max}$ $I_y(H) = Max$
$I_y(V) = 0$ ive circuits such as a "correction circuit of upper and lower horizontal-line-distortion" or a "correction circuit of vertical line distortion" are widely used in conventional arts.

PICTURE DISTORTION CORRECTION APPARATUS

FIELD OF THE INVENTION AND RELATED ART STATEMENT

1. Field of the Invention

The present invention relates to a correction apparatus and a correction technique for correcting inner pincushion distortion in the vertical direction of a cathode ray tube (CRT) display apparatus which is suitable for a display apparatus of a computer corresponding to a multiscanning system, or the like.

2. Description of the Related Art

A picture made by projection on a front screen of a CRT by deflecting electron beams mainly includes distortion of pincushion shape. In order to correct the distortion, various circuits such as a "correction circuit of upper and lower horizontal-line-distortion" or a "correction circuit of vertical line distortion" are widely used in conventional arts. However, further distortion arises in the picture corrected by these correction circuits, for example in a central part of a vertical line. Hereafter, this distortion which arises on a vertical line of the picture is called "inner pincushion distortion in vertical direction". If the front screen of the CRT has a spherical face having its center coincides with the deflection center of the electron beam, positional change of a luminescent spot from center point on the front screen is proportional to change of a deflection current. An actual front screen of the CRT is similar to a flat face. When a deflection angle and a time are represented by θ and t, respectively, a displacement amount X(t) of the luminescent spot on the flat screen is proportional to tan θ. Therefore, picture distortion called "S-distortion" arises. In the S-distortion, an amount of horizontal deflection gradually increases toward end parts of a picture face of the CRT.

FIG. 14 is a horizontal deflection circuit including an S-distortion correction circuit which is generally used in the conventional art to correct the S-distortion. Referring to FIG. 12, a pulse signal of a horizontal scanning period (hereafter is referred to as horizontal period) is applied to the base of a horizontal output transistor $Q_1$, and a sawtooth current of the horizontal period (horizontal deflection current) passes through a horizontal deflection coil 11. An S-distortion correction capacitor $C_s$ is connected in series with the horizontal deflection coil 11, and a voltage of parabolic waveform is generated on the S-distortion correction capacitor $C_s$ by the sawtooth current. A horizontal deflection current of sawtooth waveform is modulated to a S-shaped current by the voltage of parabolic waveform, and increase of an amount of horizontal deflection is suppressed in right and left end parts of the picture face. The above-mentioned method is widely used.

FIG. 2A is a waveform diagram of a general parabolic waveform voltage $e_s(t)$, and FIG. 2B is a waveform diagram of a general horizontal deflection current $I_y(t)$.

A required correction amount of the S-distortion which arises in an actual CRT display apparatus is in inverse proportion to a distance from the deflection center of the CRT to a position on the picture face, and therefore, varies dependent on the position on the picture face. For example, on a CRT screen having a large curvature radius, since an upper part and a lower part of the CRT screen are far from the deflection center in comparison with a central part, the required correction amount of the S-distortion is smaller than that in the central part. However, the above-mentioned point is not taken into account in the conventional S-distortion correction circuit. Therefore, the S-distortion is overcorrected in the upper and lower parts in comparison with the central part of the picture face, and as shown in FIG. 15, vertical lines 52 on a picture face 51 are curved to pincushion-shape, in the conventional art.

Recently, the front screen of the CRT has become more and more flat, and the deflection angle has become greater. For this reason, a required correction amount of the S-distortion totally increases. Furthermore, a difference between the distance from the deflection center to the upper or lower part and the distance from the deflection center to the central part increases, and therefore, the S-distortion further increases, such that a countermeasure for this problem is required.

OBJECT AND SUMMARY OF THE INVENTION

An object of the present invention is to provide the picture distortion correction apparatus of which a correction amount of S-distortion in an upper and a lower parts of a picture face is different from that in a central part, and a suitable S-distortion correction is realized in overall picture face of a front screen having a large curvature radius.

The picture distortion correction apparatus of a first mode of the present invention comprises a saturable reactor, and an inductance of the saturable reactor passing a horizontal deflection current is controlled corresponding to a vertical deflection current.

The picture distortion correction apparatus of a second mode of the present invention comprises a saturable reactor having a first, a second, a third and a fourth reactor coils which are wound on a core, connected in series with each other, and connected in series with a horizontal deflection coil to enable passing a horizontal deflection current through these reactor coils, a coil wound on the core through which a current of waveform of a vertical deflection current is passed as a control current, at least one permanent magnet attached to the core to apply magnetic bias field to the first and the second reactor coils in a first direction and given to the third and fourth reactor coils in a second direction opposite to the first direction, and whereby the sum of the inductances of the first, second, third and fourth reactor coils in a horizontal scanning period of an upper part and a lower part of a picture face, increases in a central part in the horizontal direction, and decreases toward both end parts in the horizontal direction in the horizontal scanning period of the central part in the vertical direction of the picture face, decreases in the central part in the horizontal direction, and increases toward both the end parts in the horizontal direction, and increases generally in vertical scanning periods in both end parts of the picture face in a vertical scanning, and decreases generally in the central part in the vertical scanning period.

Furthermore, the picture distortion correction apparatus of a third mode of the present invention comprises one or two saturable reactors to be connected to each other, each saturable reactor has a first and a second reactor coils which are wound on a core, connected in series with each other, and connected in series with the horizontal deflection coil to enable passing a horizontal deflection current through these reactor coils, a coil wound on the core through which a current of waveform of a vertical deflection current is passed as a control current, a permanent magnet attached to the core so that magnetic bias is given to the first and second reactor coils, and whereby the sum of the inductances of the first and second reactor coils in the horizontal scanning period of the upper part and the lower part of the picture face, increases in the central part in the horizontal direction, and decreases toward both end parts in the horizontal direction, in the horizontal scanning period of the central part of the upper and lower parts of the picture face, decreases in the central part in the horizontal direction, and increases toward both end parts in the horizontal direction, and increases generally in the vertical scanning periods of both end parts in the vertical scanning, and decreases generally in the central part in the vertical scanning period.

According to the first mode, since the inductance of the saturable reactor is controlled depending on the vertical deflection current, a correction amount of the S-distortion in the horizontal deflection can be varied corresponding to the amount of the vertical deflection.

Consequently, the correction amount of the S-distortion of the horizontal deflection can be selected to a suitable value, and an inner pincushion distortion in the vertical direction can be corrected.

According to the second and third modes, the inductance of the saturable reactor connected in series with the horizontal deflection coil is varied in the vertical scanning period (hereinafter is referred to as vertical period) and the horizontal scanning period (hereinafter is refereed to as horizontal period). Consequently, the correction amount of the S-distortion is controlled in the vertical period, and horizontal linearity of the horizontal deflection current is controlled by varying the inductance in the horizontal period, and an amount of the control is further varied in the vertical period. Consequently, the inner pincushion distortion in the vertical direction is corrected. When the inductances of the reactor coils of the saturable reactor are increased in the horizontal scanning of the upper part or the lower part of the picture face in comparison with the horizontal scanning of the center in the vertical direction of the picture face by S-distortion correction control, effect of the S-distortion correction is reduced. Consequently, an amplitude of the horizontal deflection current can be reduced in the center in the vertical direction of the picture face, and extended in the left and right end parts.

Furthermore, a total inductance of the first to fourth reactor coils increases in the central part in the horizontal direction in the use of deflection to the upper part and the lower part of the picture face, decreases in the central part and increases toward both end parts in the horizontal direction in the case of deflection in the center part of the vertical direction of the picture face, and increases in both end parts and decreases in the central part in the vertical scanning period. Consequently, the signal of the S-distortion correction can be modulated in the vertical period. Moreover, a correction amount of horizontal linearity in the central part and a peripheral part of the picture face by variation of the total inductance of the saturable reactor in the horizontal scanning period can be changed in the vertical scanning period. Consequently, the inner pincushion distortion in the vertical direction can be corrected without giving harmful influence to other part of the picture.

Moreover, when the central parts of the upper part and the lower part of the picture face are horizon tally scanned, the inductances of the reactor coils are decreased rather than those in the horizontal scanning of the upper part and the lower part. Consequently, effect of S-distortion correction is enhanced, and an amplitude of the horizontal deflection current can be extended in the center and reduced in both right and left end parts in the vertical direction of the picture face, As a result, the inner pincushion distortion in the vertical distortion can be improved.

Control of the horizontal linearlity is described hereafter. In the horizontal scanning in both the lower and upper end parts in the vertical scanning, the inductance of the saturable reactor is increased in the central period in the horizontal period, and the inductance is decreased in the periods of both the end parts in the horizontal period, and the amplitude of the horizontal deflection current is reduced in the central part and extended in the periods of the right and left end parts in the vertical scanning. Furthermore, in the horizontal scanning in the central part of the vertical scanning, the inductance of the saturable reactor is decreased in the central period of the horizontal period, and the inductance is increased in the period of both end parts of the horizontal period, and the amplitude of the horizontal deflection current is extended in the central part and reduced in the periods of both right and left end parts in the vertical scanning. Consequently, the inner pincushion distortion in the vertical direction is improved.

DESCRIPTION OF THE PREFERRED EMBODIMENT

Preferred embodiments of the present invention will be described in detail hereafter with reference to FIG. 1 to FIG. 13.

[First Embodiment]

A first embodiment of the present invention is described hereafter with reference to FIG. 1 to FIG. 10.

Figure 1:
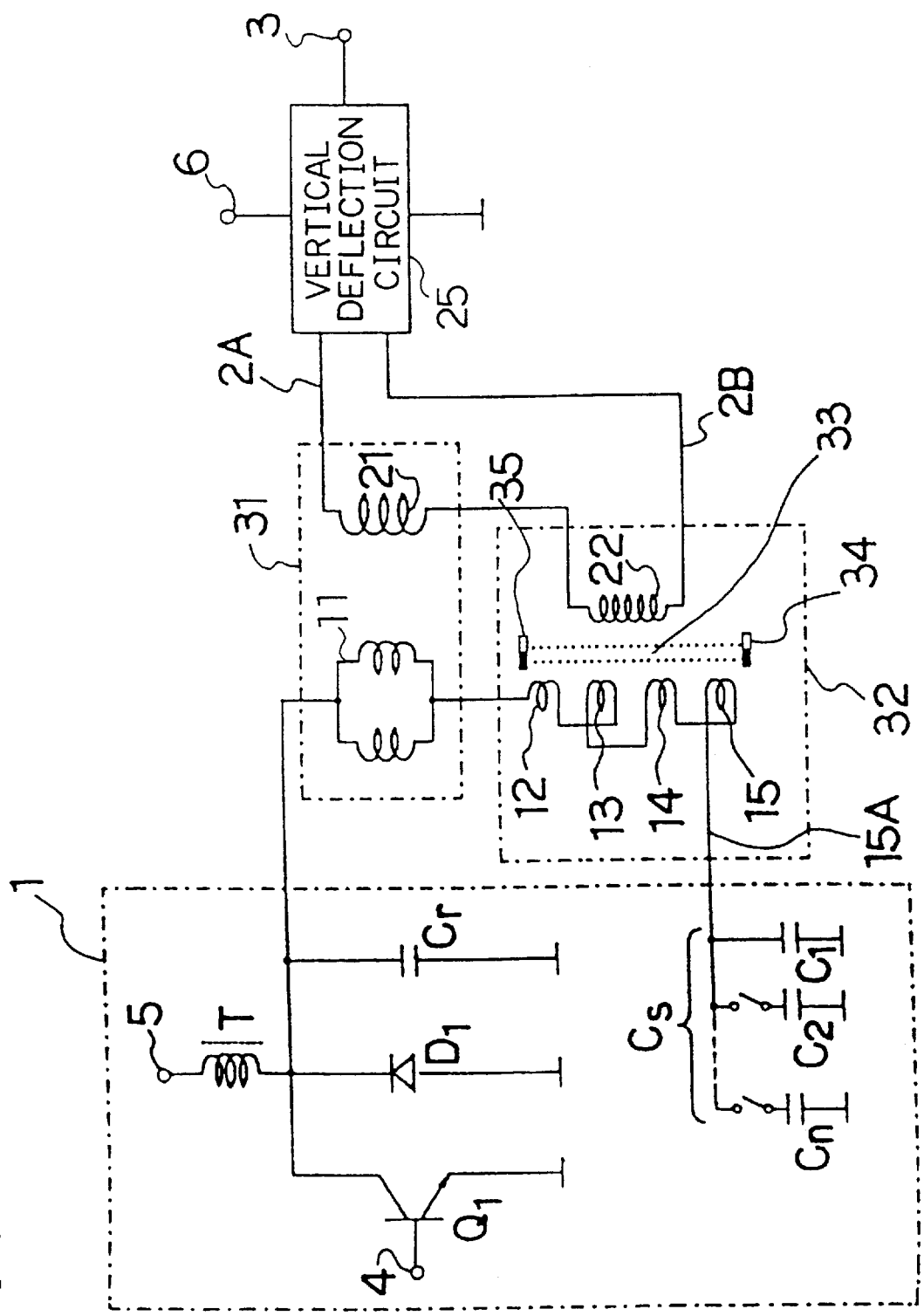
FIG. 1 is a circuit diagram of a deflection circuit comprising a saturable reactor of a first embodiment of the present invention.

FIG. 1 is a circuit diagram of a deflection circuit for deflecting an electron beam comprising a saturable reactor of the first embodiment of the present invention. The deflection circuit comprises a horizontal deflection circuit 1 including a S-distortion correction capacitor $C_s$, a vertical deflection circuit 25, a deflection yoke 31 receiving outputs of the horizontal deflection circuit 1 and the vertical deflection circuit 25 and a saturable reactor unit 32 for correcting "inner pincushion distortion in the vertical direction".

In the horizontal deflection circuit 1, a terminal 5 to be coupled to a power source is connected through a choke coil T to the collector of a horizontal output transistor $Q_1$, the cathode of a diode $D_1$, a horizontal resonance capacitor $C_r$, and one end of a horizontal deflection coil 11 of the deflection yoke 31. The other end of the horizontal deflection coil 11 is connected to one end of a first reactor coil 12 of the saturable reactor unit 32. A second reactor coil 13, a third reactor coil 14 and a fourth reactor coil 15 are connected in series with the first reactor coil 12 in the named order, and a terminal 15A of the fourth reactor coil 15 is connected to an S-distortion correction capacitor $C_s$.

In the vertical deflection circuit 25, a terminal 6 is connected to a power source (not shown), and a terminal 3 is connected to a vertical deflection driving circuit (not shown). A serially-coupled pair of a vertical deflection coil 21 of the vertical deflection yoke 31 and a fifth coil 22 of the saturable reactor unit 32 is connected across output terminals 2A and 2B of the vertical deflection circuit 25.

Figure 5:
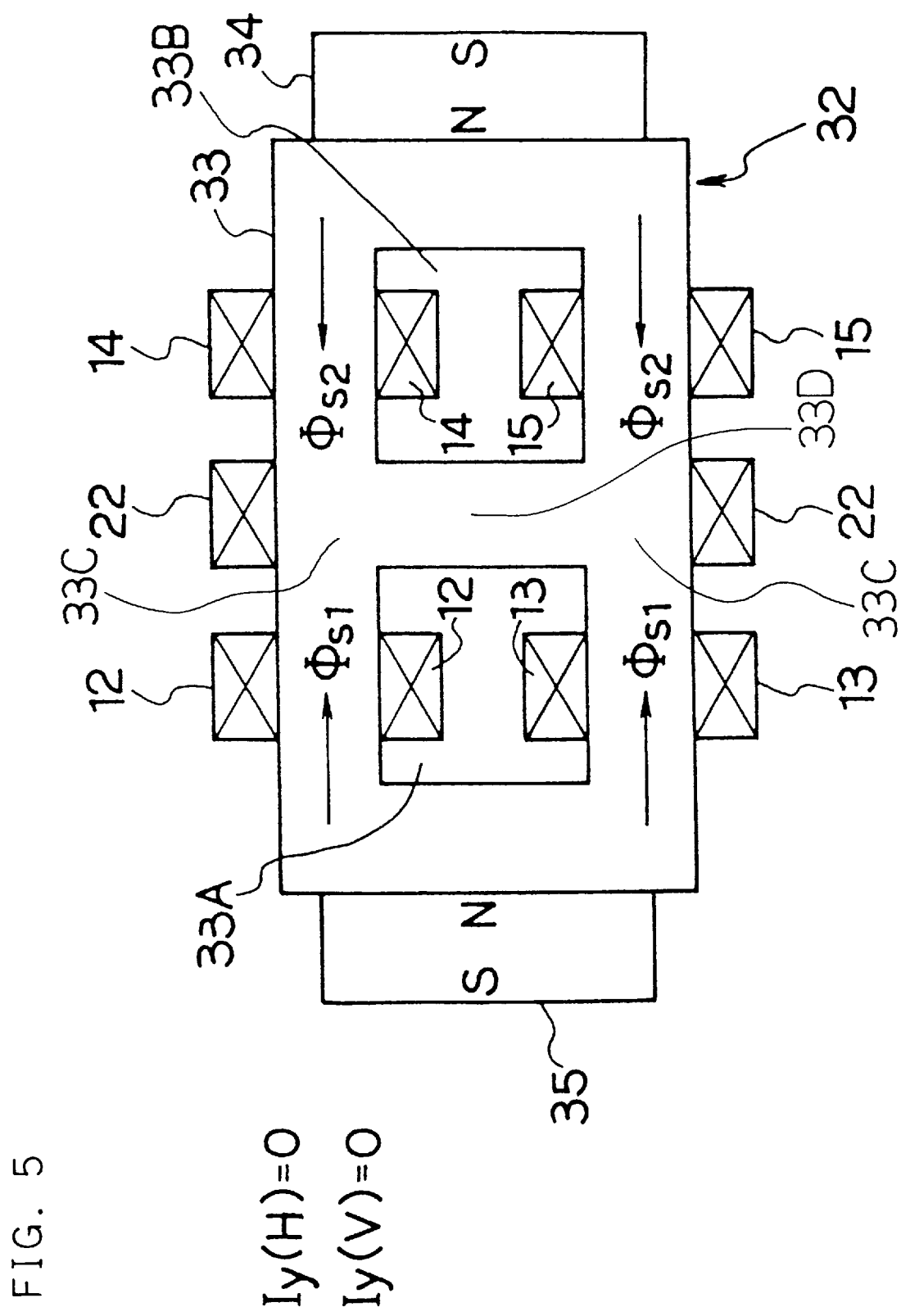
FIG. 5 is a cross-sectional view of the saturable reactor in the first embodiment.

The reactor coils 12, 13, 14 and 15 from first coils of the saturable reactor unit 32, and the coil 22 from a second coil of the saturable reactor unit 32. These coils are, as shown in FIG. 5, wound on a core 33 having two windows 33A and 33B. Inductances of the reactor coils 12, 13, 14 and 15 are represented by $L_1$, $L_2$, $L_3$ and $L_4$, respectively. In FIG. 1, the horizontal deflection circuit 1 generates a sawtooth current of a horizontal scanning period (hereinafter is referred to as horizontal period), and causes the horizontal deflection current to flow in the horizontal deflection coil 11 of the deflection yoke 31. The vertical deflection circuit 25 generates a sawtooth current of a vertical scanning period (hereinafter is referred to as vertical period), and causes the vertical deflection current to flow to the vertical deflection coli 21 of the deflection yoke 31.

The first reactor coil 12 and the second reactor coil 13 are connected in series in inverse polarity with each other so that waveform change of the reactor coil 12 caused by change of the horizontal deflection current is in inverse polarity to waveform change of the reactor coil 13 caused by the change of the horizontal deflection current, so that changes of inductances of the reactor coils 12 and 13 are each-other opposite. For example, when the inductance of the reactor coil 12 decreases by change of the horizontal deflection current, the inductance of the reactor coil 13 increases.

Figure 4:
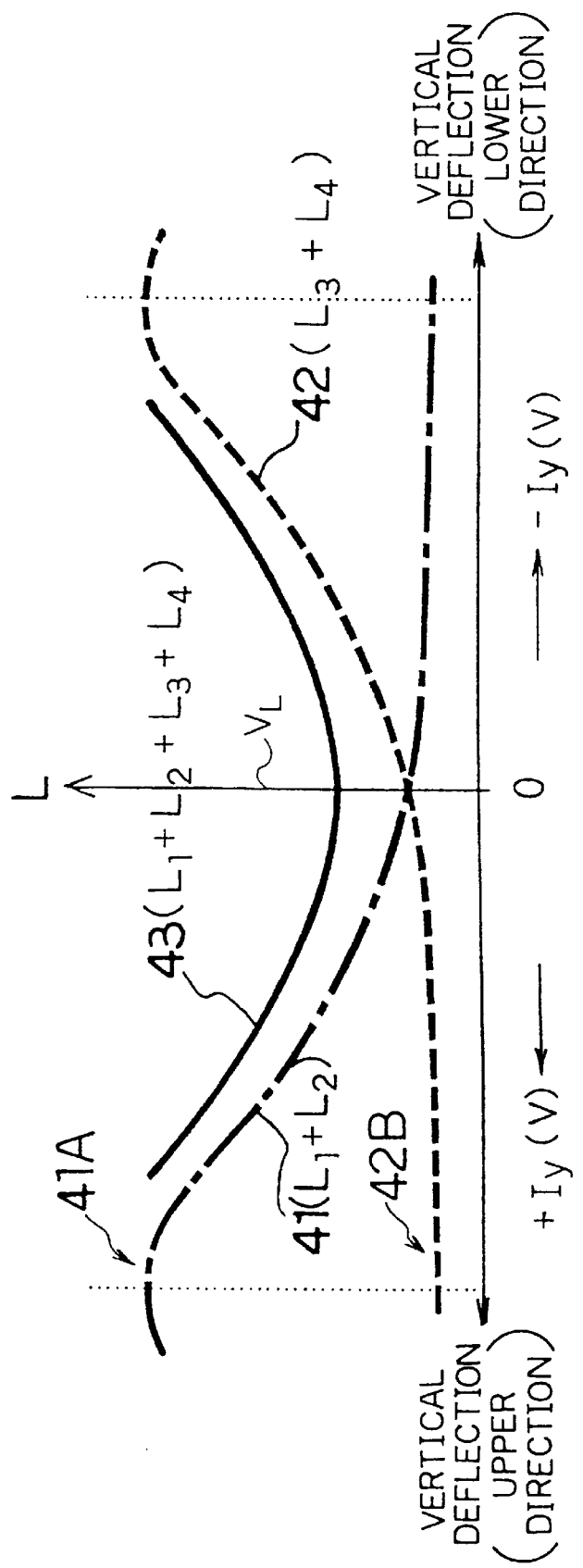
FIG. 4 is a diagram representing inductances of reactor coils in vertical deflection in the first embodiment.

The third reactor coil 14 and the fourth reactor coil 15 are also similarly connected in series in inverse polarity with each other so that the waveform change of the reactor coil 14 caused by change of the horizontal deflection current is in inverse polarity to the waveform change of the reactor coil 15 caused by the change of the horizontal deflection current. By the above-mentioned connection, variation of a total inductance $L_s$ of the saturable reactor 32 ($L_s = L_1 + L_2 + L_3 + L_4$) caused by variation of the horizontal deflection current passing through the reactor coils 12–15 is symmetrical with respect to a vertical line $V_L$ on the center of the picture face as shown by a curve 43 in FIG. 4. FIG. 4 is described in detail later.

A constant magnetic bias is applied to the first to fourth reactor coils 12–15 by permanent magnets 34 and 35. Therefore, magnetically saturated states of the first to fourth reactor coils 12–15 are controlled on the basis of change of the waveform of the vertical deflection current passing in the coil 22 which is magnetically coupled to the first to fourth reactor coils 12–15. In an example shown in FIG. 4, the first and second reactor coils 12 and 13 have characteristics such that the total inductance ($L_1 + L_2$) of the inductance $L_1$ and the inductance $L_2$, shown by a curve 41, increases at a part corresponding to an upper part of the picture face, and decreases at a part corresponding to a lower part thereof.

The third reactor coil 14 and the fourth reactor coil 15 have characteristics such that a curve 42 representing the total inductance ($L_3 + L_4$) of the inductance $L_3$ and the inductance $L_4$ is symmetrical to the curve 41 with respect to the line $V_L$ representing zero of the vertical deflection current. By the above-mentioned characteristics, the total inductance $L_S$ which is the sum of the inductances of the first to fourth reactor coils 12–15 shown by a curve 43 in FIG. 4 increases toward an upper end and a lower end of the picture face of vertical deflection, and decreases in the center part. As mentioned above, by means of the change of the composite inductance with the vertical period, the S-distortion correction amount (which is amount of known correction current to be added to the horizontal deflection current so as to correct the S-direction) is modulated.

Figure 2A:
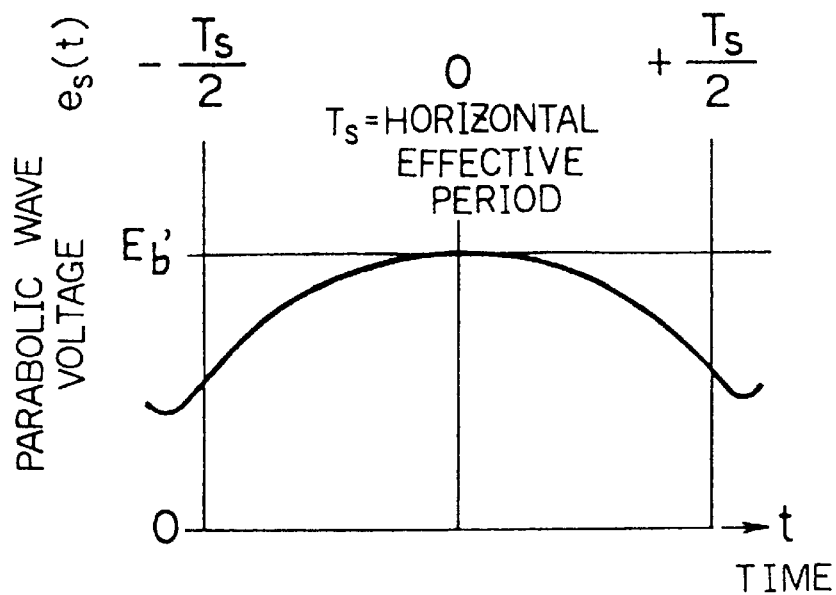
FIG. 2A is a waveform diagram of a general parabolic waveform voltage $e_s(t)$ generated in a S-distortion correction capacitor $C_s$, which is common to the present invention and the prior art.
Figure 2B:
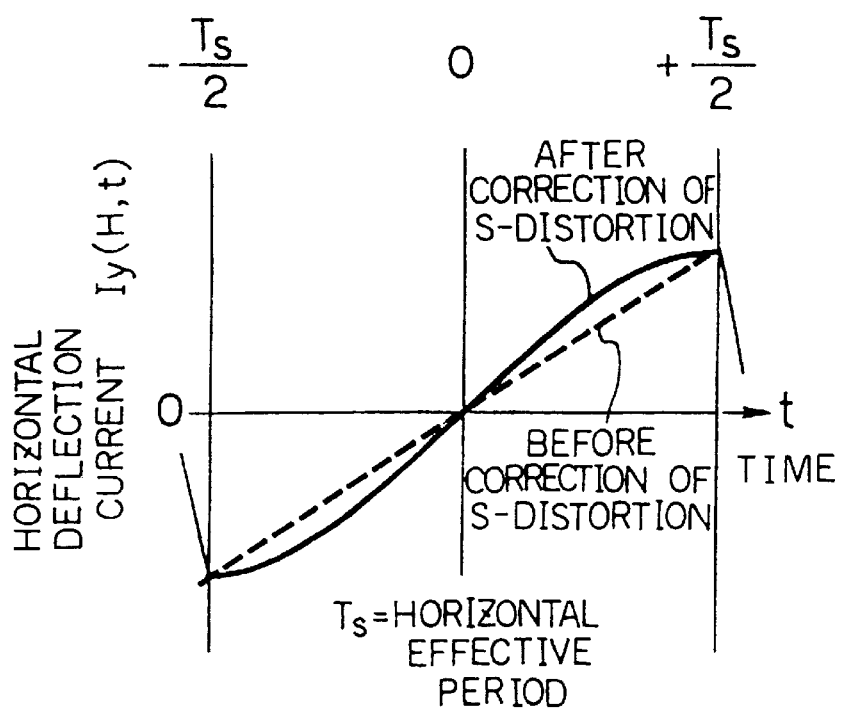
FIG. 2B is a waveform diagram of a general horizontal deflection current $I_y(H)(t)$, which is common to the present invention and the prior art.

As generally known, the S-distortion has been corrected by modulating the horizontal deflection current of the sawtooth waveform in a stretched S-shape manner by using a parabolic waveform voltage $e_s(t)$ generated at the S-distortion correction capacitor $C_s$. The parabolic waveform voltage $e_s(t)$ generated at the S-distortion correction capacitor $C_s$ is shown in FIG. 2A. The waveform of the horizontal deflection current $I_y(H, t)$ modulated by the parabolic waveform voltage $e_s(t)$ is shown in FIG. 2B.

Figure 3:
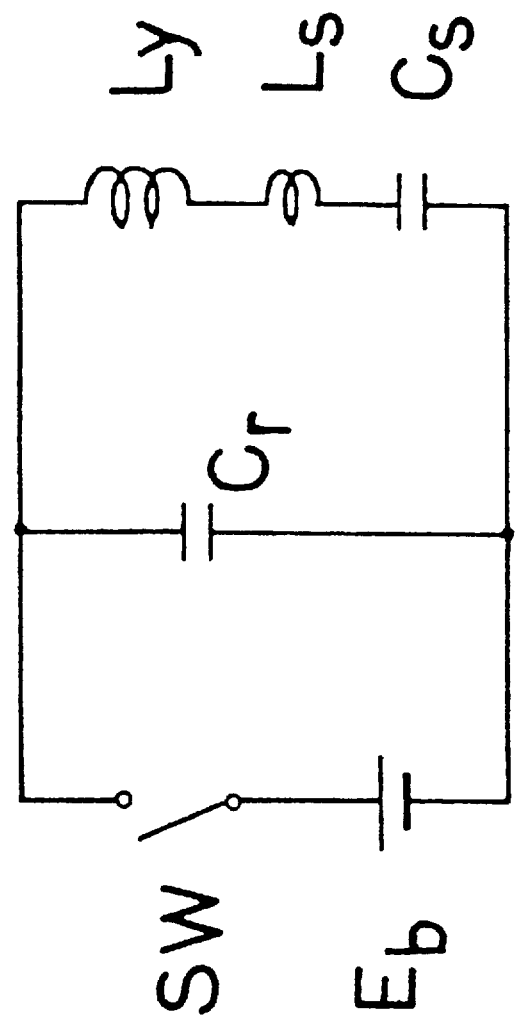
FIG. 3 is an equivalent circuit of a horizontal deflection circuit in the present invention.

FIG. 3 is an equivalent circuit of the horizontal deflection circuit 1, the vertical deflection circuit 25, the saturable reactor unit 32 and the horizontal defection coil 11 in FIG. 1. A power supply voltage applied to the terminal 5 in FIG. 1 is represented by $E_b$. The horizontal output transistor $Q_1$ which is operated by a pulse signal of the horizontal period applied to a terminal 4 and a damper diode $D_1$ are represented by SW. A horizontal resonance capacitor is represented by $C_r$. A capacitance of the S-distortion correction capacitor $C_s$ is represented by CS, and an inductance of the horizontal deflection coil 11 is represented by $L_y$. The total inductance ($L_1 + L_2 + L_3 + L_4$) is represented by $L_s$. The total inductance $L_s$ is varied by modulation in the vertical period.

As mentioned above, the S-distortion correction amount of the horizontal deflection current $I_y(H)$ is varied by variation of the total inductance $L_s$ in the vertical period.

Hereafter, the variation of the S-distortion correction amount is described. A voltage across both terminals of the S-distortion correction capacitor $C_s$ becomes a waveform shown in FIG. 2A by superimposing the parabolic waveform voltage $e_s(t)$. The horizontal deflection current $I_y(H)$ passing through the horizontal deflection coil 11 is varied by the parabolic waveform voltage $e_s(t)$ as shown by FIG. 2B. In FIG. 2A, in the period from time $-T_s/2$ to time $+T_s/2$ ($-T_s/2 \leq t \leq +T_s/2$, time $T_s$ is a horizontal effective period), the square $\omega_s^2$ of an angular frequency $\omega_s$ and the parabolic waveform voltage $e_s$ (t) are represented by the following equations (1) and (2), respectively, which are obvious to one skilled in the art.

$$\omega_s^2 = 1/CS \cdot (L_y + L_s) \quad (1)$$

$$e_s(t) = E_b' \cdot \cos\omega_s t \quad (2)$$

where $E_b'$ is a peak voltage of the parabolic waveform voltage $e_s(t)$ and is approximately equal to the power supply voltage $E_b$.

According to equations (1) and (2), it is recognized that the greater the total inductance $L_s$ becomes, the lower the angular frequency $\omega_s$ becomes and the waveform of the parabolic waveform voltage $e_s(t)$ becomes flat. The saturable reactor 32 is modulated in the vertical scanning period, and as shown in FIG. 4, the total inductance $L_s$ shown by the curve 43 increases in the upper part and the lower part in the vertical direction of the picture face in comparison with the central part of the picture face, and effect of the S-distortion correction decreases. Consequently, in the upper and lower parts in the vertical direction of the picture face, both right end part and left end part of a picture tend to extend, and the central part of the picture tends to shrink in the horizontal direction, in comparison with the central part in the vertical direction of the picture face. Therefore, overcorrection of the S-distortion in the upper and lower parts of the picture face is improved, and as a result, the inner pincushion distortion in the vertical direction is improved.

Configuration of the saturable reactor 32 in the first embodiment is described in detail with reference to FIG. 5. The core 33 having two windows 33A and 33B is provided with two permanent magnets 34 and 35 for producing a fixed magnetic field. The first reactor coil 12 and the second reactor coil 13 are wound through the window 33A of the core 33. The third reactor coil 14 and the fourth reactor coil 15 are wound through the window 33B. Moreover, the fifth coil 22 is wound around the whole core 33 at the central part. In FIG. 5, the reactor coils 12–15 and the coil 22 are shown by respective cross-sections. The fifth coil 22 produces magnetic field which is varied by the vertical deflection current in the vertical scanning period. Two permanent magnets 34 and 35 are arranged symmetrically with respect to the center axis of the center leg 33D between two windows 33A and 33B of the core 33 at both ends of the core 33, respectively. The permanent magnets 34 and 35 are attached to the core 33 in such direction that respective magnetic lines are directed to central parts 33C of the core 33, and the magnetic fields produced by the permanent magnets 34 and 35 are cancelled in the core 33 except the central parts 33C of a circumferential part of the core 33. In the above-mentioned configuration, the magnetic fields in the reactor coils 12, 13, 14 and 15 are different from each other depending on respective values and polarities of currents passing through the reactor coils 12–15. Furthermore, magnetic field produced by the coil 22 is varied by a current passing through the coil 22, but the magnetic fields produced by the permanent magnets 34 and 35 do not change.

When currents of the reactor coils 12–15 are zero (horizontal deflection current $I_y(H)$ is zero, and vertical deflection current $I_y(V)$ is zero), namely, when the center of the picture face is scanned, state of magnetic field of the core 33 is shown in FIG. 5. In the state shown in FIG. 5, the reactor coils 12–15 are saturated by magnetic fields $\Phi_{s1}$ and $\Phi_{s2}$ of the permanent magnets 34 and 35 in the directions shown by respective arrows of solid lines. Therefore, the total inductance $L_s$ ($L_s = L_1 + L_2 + L_3 + L_4$) of these reactor coils 12–15 has a low value.

Figure 6:
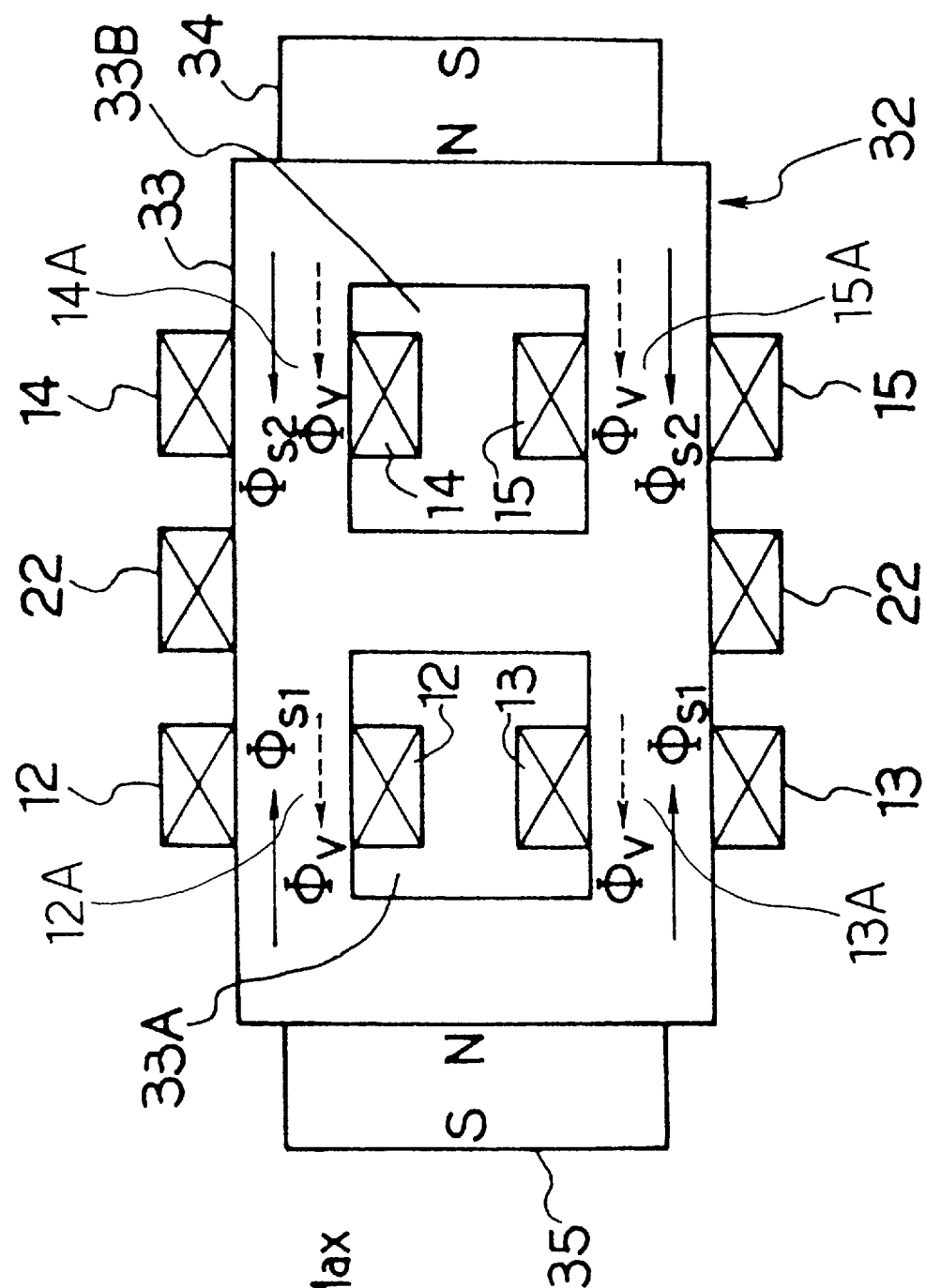
FIG. 6 is a cross-sectional view of the saturable reactor in the first embodiment, when a vertical deflection current $I_y(V)$ passes through the saturable reactor.

FIG. 6 shows state of magnetic field produced in the core 33 when the maximum vertical deflection current $I_y(V)$ passes through the coil 22 of the saturable reactor 32. The configuration of the saturable reactor 32 is identical with that in FIG. 5. For the sake of simplicity, FIG. 6 shows the state where the horizontal deflection current $I_y(H)$ to be passed through the reactor coils 12–15 is zero. In this state, the electron beam is deflected to the upper part of the picture face, and magnetic fields produced by the coil 22 are shown by broken-line-arrows $\Phi_v$ (hereinafter is referred to as magnetic fields $\Phi_v$). Magnetic fields in the parts 12A and 13A of the core 33 surrounded by the respective reactor coils 12 and 13 becomes values represented by $\Phi_{s1} - \Phi_v$ each of which is a difference between magnetic field $\Phi_{s1}$ and the magnetic field $\Phi_v$. Therefore, the magnetic fields in the parts 12A and 13A decrease, and the sum of the inductances $L_1$ and $L_2$ increases at a hill portion 41A of the curve 41 shown in FIG. 4. On the contrary, magnetic fields in the parts 14A and 15A of the core 33 surrounded by the respective reactor coils 14 and 15 are the sum of magnetic fields $\Phi_{s2}$ and $\Phi_v$. Therefore, the magnetic fields in the parts 14A and 15A increase, and the sum of the inductances $L_3$ and $L_4$ decreases to a flat portion 42B of the curve 42 shown in FIG. 4.

When the electron beam is deflected to the lower part of the picture face, the polarity of the vertical deflection current $I_y(V)$ is reversed, and the direction of the magnetic field $\Phi_v$ shown in FIG. 6 is also reversed. In order to realize effective characteristic for correcting the picture on the basis of the curve 43 of the total inductance $L_s$ shown in FIG. 4, relations among the absolute values of the magnetic field $\Phi_v$ made by current in the coil 22 and the magnetic fields $\Phi_{s1}$ and $\Phi_{s2}$ made by currents in the respective permanent magnets 34 and 35 are selected as:

$\Phi_v < \Phi_{s1}$, $\Phi_v < \Phi_{s2}$, and $\Phi_{s1} = \Phi_{s2}$.

By the above-mentioned selections, the total inductance $L_s$ becomes a valley-like characteristic lowered in the central part in the vertical period as shown by the curve 43 in FIG. 4, and the above-mentioned characteristic of the S-distortion correction can be improved.

Figure 7:
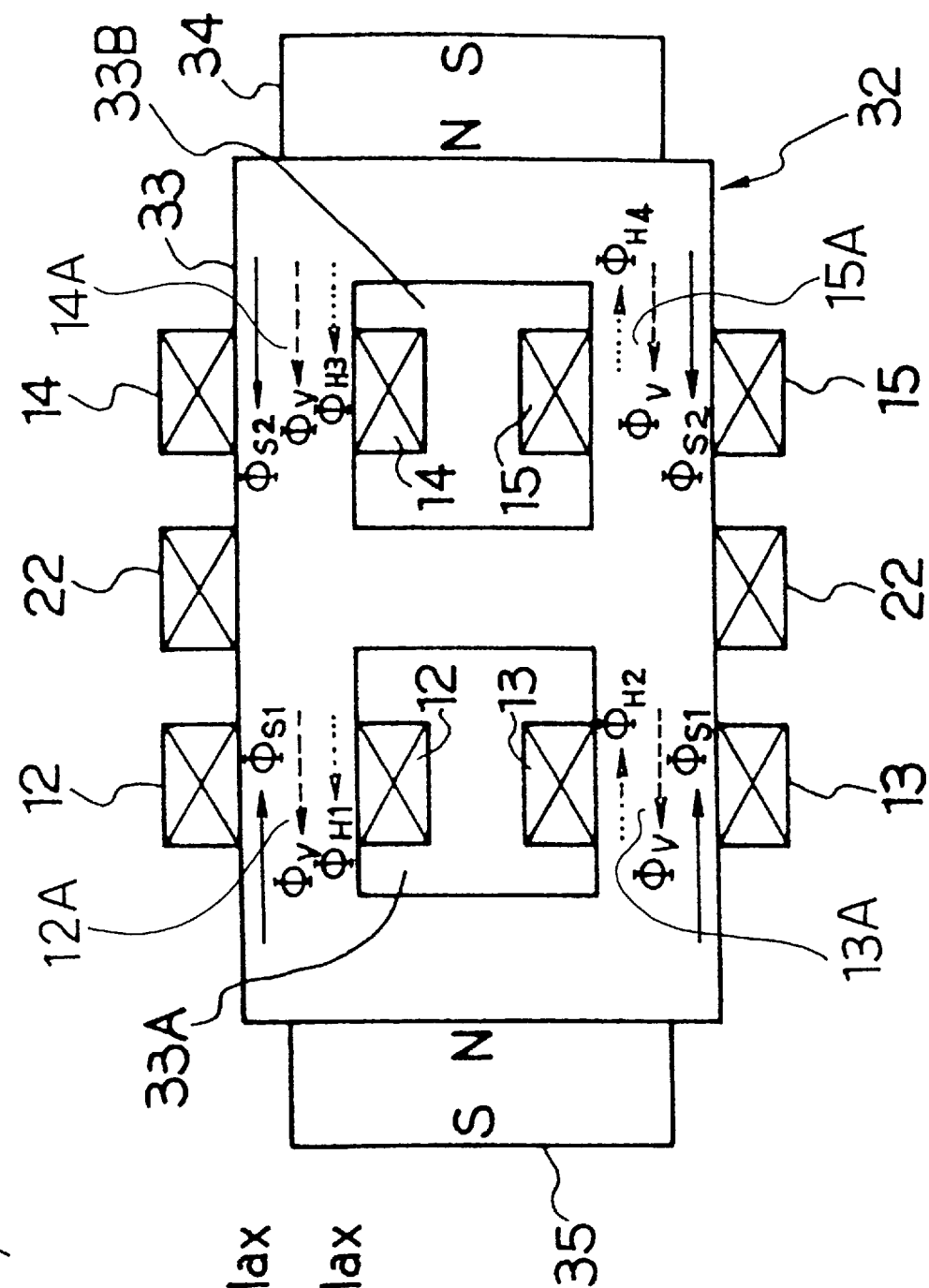
FIG. 7 is a cross-sectional view of the saturable reactor in the first embodiment, when the vertical deflection current $I_y(V)$ and a horizontal deflection current $I_y(H)$ pass through the saturable reactor.

Correcting operation of the inner pincushion distortion by variation of the total inductance $L_s$ in a horizontal scanning period is described hereafter with reference to FIG. 7. The saturable reactor 32 shown in FIG. 7 is the same as that shown in FIG. 5. The total inductance $L_s$ is also varied by the horizontal deflection current $I_y(H)$ passing through the reactor coils 12, 13, 14 and 15.

FIG. 7 shows state of magnetic field of the core 33 when the maximum vertical deflection current $I_y(V)$ passes through the coil 22, and the maximum horizontal deflection current $I_y(H)$ passes through the reactor coils 12–15. In this state, the electron beam is deflected upward of the picture face by the vertical deflection current $I_y(V)$ passing through the coil 22, and the magnetic fields $\Phi_v$ are produced in the core 33. Magnetic field produced by the reactor coil 12 is represented by arrow $\Phi_{H1}$, and magnetic field produced by the reactor coil 13 is represented by arrow $\Phi_{H2}$. Magnetic field produced by the reactor coil 14 is represented by arrow $\Phi_{H3}$, and magnetic field produced by the reactor coil 15 is represented by arrow $\Phi_{H4}$. Hereinafter, arrows $\Phi_{H1}$, $\Phi_{H2}$, $\Phi_{H3}$ and $\Phi_4$ designates directions of magnetic fields $\Phi_{H1}$, $\Phi_{H2}$, $\Phi_{H3}$ and $\Phi_{H4}$, respectively. Respective absolute values of the magnetic fields $\Phi_{H1}$, $\Phi_{H2}$, $\Phi_{H3}$ and $\Phi_{H4}$ are selected equally to each other ($\Phi_{H1}=\Phi_{H2}=\Phi_{H3}=\Phi_{H4}$), and each absolute value is represented by $\Phi_{Hn}$. Furthermore, each absolute value of the magnetic fields $\Phi_{s1}$ and $\Phi_{s2}$ produced by the permanent magnets 34 and 35 is represented by $\Phi_{sn}$. Relation among the absolute values $\Phi_{Hn}$, $\Phi_{sn}$ and $\Phi_v$ is selected to as follows:

$$\Phi_{Hn} < \Phi_v < \Phi_{sn}.$$

In the case of selection as mentioned above, scanning state on an upper-left hand part of the picture face is described hereafter. Referring to FIG. 7, the magnetic field in the part 12A of the core 33 having the coil 12 is represented by $$\Phi_{s1} - \Phi_v - \Phi_{H1}.$$

Therefore, the inductance $L_1$ of the reactor coil 12 slightly increases, while variation of the magnetic field $\times\Phi_v+\Phi_{H1}$ is small, because the sum of the magnetic fields $\Phi_v$ and $\Phi_{H1}$ ($\Phi_v+\Phi_{H1}$) approaches the magnetic field $\Phi_{s1}$. Ask In the part 13A of the core 33 having the reactor coil 13, the magnetic field is represented by $$\Phi_{s1} - \Phi_v + \Phi_{H2},$$

and therefore, the inductance $L_2$ is small. Even if the magnetic fields $\Phi_{H3}$ and $\Phi_{H4}$ are varied, the sum of the respective inductances $L_3$ and $L_4$ of the reactor coils 14 and 15 is kept to a small value, and therefore can be disregarded in the operation. The reason is that the magnetic saturation is produced by the sum ($\Phi_{s2}+\Phi_v$) of the magnetic field $\Phi_{s2}$ and $\Phi_v$.

In FIG. 7, the description has been made as to the scanning state in the upper-left hand part of the picture face, when polarities of the vertical deflection current and horizontal deflection current are changed, namely polarities of the magnetic fields (directions of arrows) are changed. Similar changes of the inductance to the above-mentioned case are obtained in the case of scanning in an upper-right hand part, a lower-left hand part or a lower-right hand part of the picture face. Consequently, characteristic of total inductance variation becomes symmetrical with respect to the vertical center line of the picture face.

Figure 8:
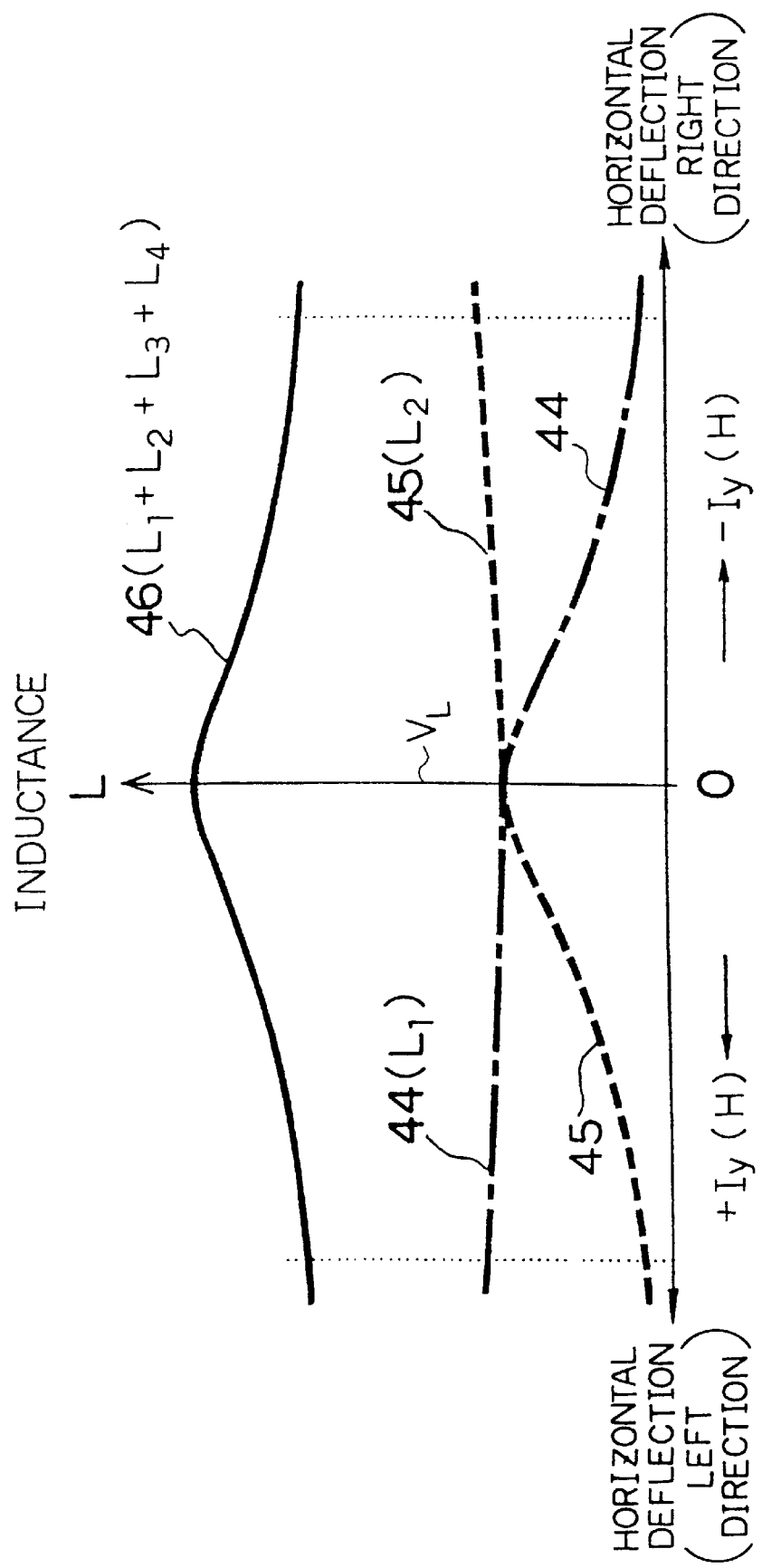
FIG. 8 is a diagram representing inductances of the reactor coils in horizontal deflection in the first embodiment.

FIG. 8 is a diagram showing variation of inductances in a horizontal scanning period when an upper part of the picture face is scanned. Referring to FIG. 8, when the inductance $L_1$ of the reactor coil 12 is shown by a curve 44, and the inductance $L_2$ of the reactor coil 13 is shown by a curve 45, then the total inductance $L_s$ ($L_1 30\ L_2+L_3+L_4$) is shown by a curve 46, since the inductance $L_3+L_4$ are negligibly small. When the inductance $L_1$ of FIG. 8 is replaced with the inductance $L_4$ in the curve 44, and the inductance $L_2$ of FIG. 8 is replaced with the inductance $L_3$ in the curve 45, the curve 46 will represents characteristic of inductance in scanning of a lower part of the picture face.

Figure 9:
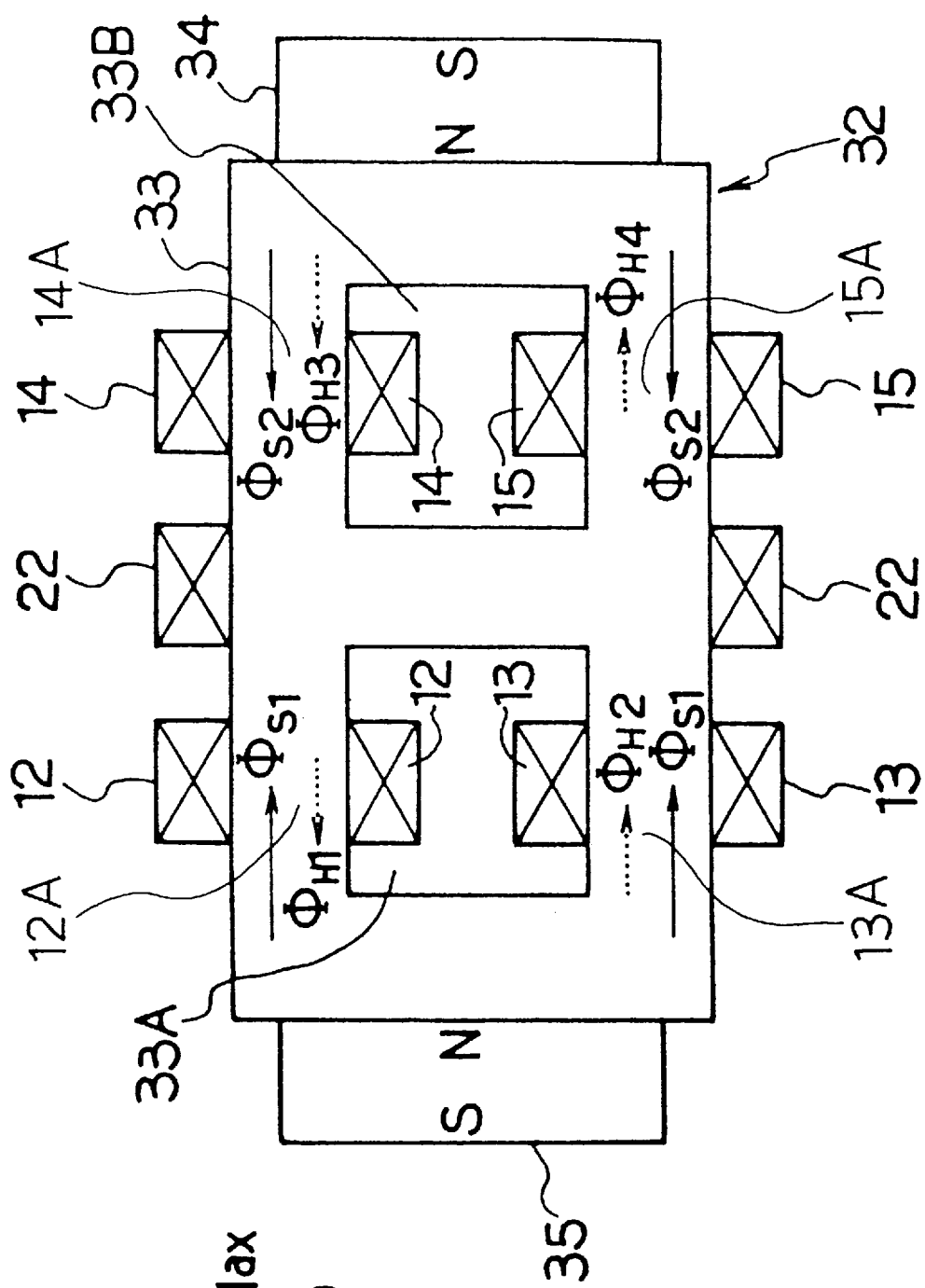
FIG. 9 is a cross-sectional view of the saturable reactor in the first embodiment, when the horizontal deflection current $I_y(H)$ passes through the saturable reactor.

FIG. 9 shows state of magnetic field of the core 33 in scanning of a leftward part of the picture face (vertical deflection angle is zero). The state of the magnetic field is elucidated comparing with the scanning state in the central part of the picture face shown in FIG. 5. In the state of FIG. 9, the magnetic field in the part 12A of the core 33 having the reactor coil 12 is represented by the difference ($\Phi_{s1}-\Phi_{H1}$) between the magnetic fields $\Phi_{s1}$ and $\Phi_{H1}$, and therefore the inductance $L_1$ is large. The magnetic field in the part 15A of the core 33 having the reactor coil 15 is represented by the difference ($\Phi_{s2}-\Phi_{H4}$) between the magnetic fields $\Phi_{s2}$ and $\Phi_{H4}$, and therefore, the inductance $L_4$ is large. In the part 13A of the core 33 having the reactor coil 13 and in the part 14A of the core 33 having the reactor coil 14, the magnetic saturation have already taken place and therefore respective inductances $L_2$ and $L_3$ are small. Since the magnetic saturation takes place in the parts 13A and 14A are saturated by the magnetic fields of the respective permanent magnets 34 and 35, variations of the respective inductances are also small.

Figure 10:
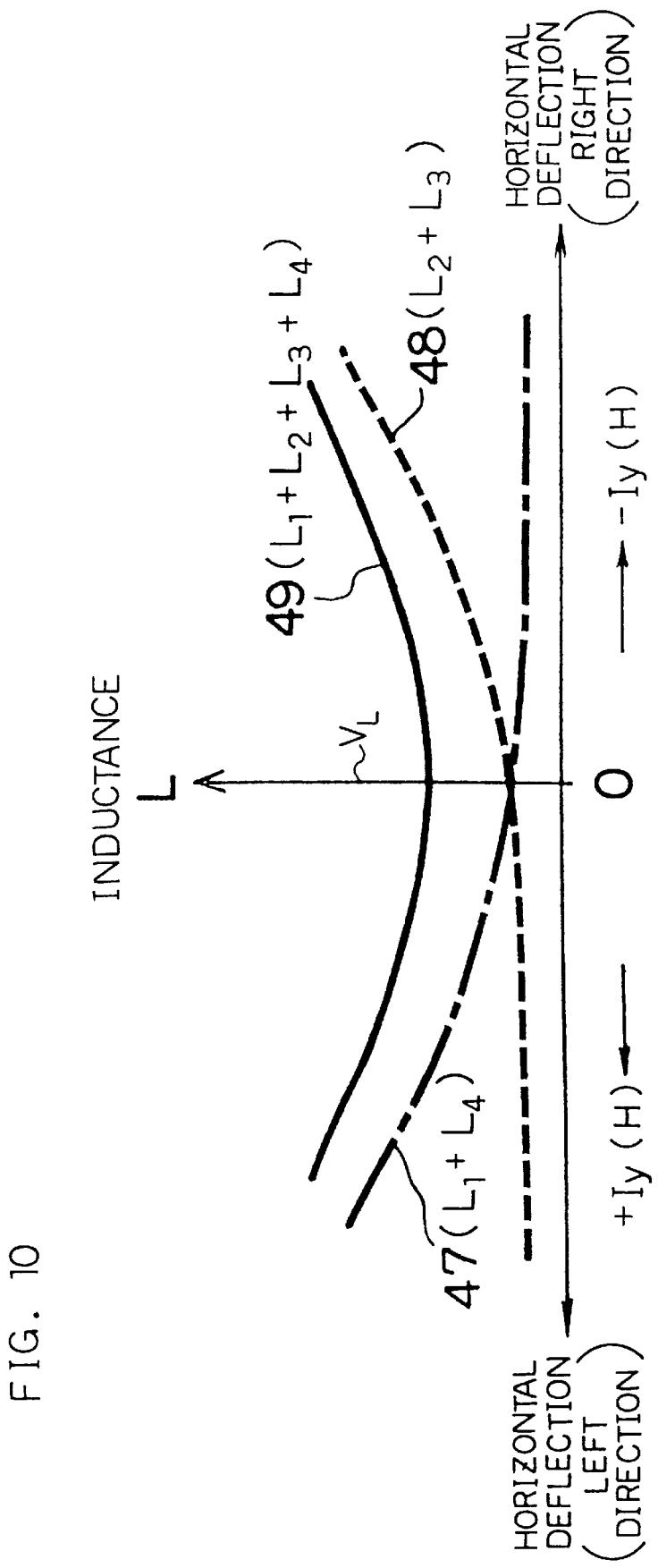
FIG. 10 is a diagram representing inductances of the reactor coils in the horizontal deflection in the first embodiment.

In the state when the vertical deflection is not applied to the electron beam (namely, when vertical deflection angle is zero) as mentioned above, variation of inductance in the horizontal scanning period is described with reference to FIG. 10. In FIG. 10, the sum ($L_1+L_4$) of the inductance $L_1$ of the reactor coil 12 and the inductance $L_4$ of the reactor coil 15 is shown by a curve 47, and the sum ($L_2+L_3$) of the inductance $L_2$ of the reactor coil 13 and the inductance $L_3$ of the reactor coil 14 is shown by a curve 48. The total inductance $L_s$ ($L_1+L_2+L_3+L_4$) is shown by a curve 49.

In FIG. 1, since the reactor coils 12, 13, 14 and 15 of the saturable reactor 32 are connected in series with the horizontal deflection coil 11, an amplitude of the horizontal deflection current $I_y(H)$ is partially extended or reduced in the horizontal deflection direction by the variation of the total inductance $L_s$ in the horizontal scanning period. In the upper part and the lower part of the picture face, the amplitude of the horizontal deflection current $I_y(H)$ is reduced in the central part and extended in both end parts of the horizontal deflection of the picture face. In the central part in the vertical deflection direction, the amplitude of the horizontal deflection current $I_y(H)$ is extended in the central part in the horizontal deflection, and reduced in both left and right end parts. Consequently, the inner pincushion distortion in the vertical direction is improved in addition to the improvement of the S-distortion correction as mentioned above.

Although the variation of the total inductance $L_s$ in the vertical scanning period, induces a slight horizontal amplitude variation in overall picture face, the induced variation serves to reduce known side pincushion distortion (not disclosed in the above), which is generally produced at end parts of the picture face. The amount of correction described above is one tenth or below of an amount of correction of the side pincushion distortion, and therefore, the S-distortion correction in the present embodiment does not give harmful influence to other picture distortions.

In the picture distortion correction apparatus of the first embodiment, the first to fourth reactor coils 12–15 and the fifth coil 22 of the saturable reactor 32 are connected in series with the horizontal deflection coil 11 and the vertical deflection coil 21 of the deflection yoke 31, respectively, and therefore, no other connection than the above connections is necessary. Therefore, the picture distortion correction apparatus of the first embodiment can be easily incorporated into a conventional deflection circuit.

[Second Embodiment]

Figure 11:
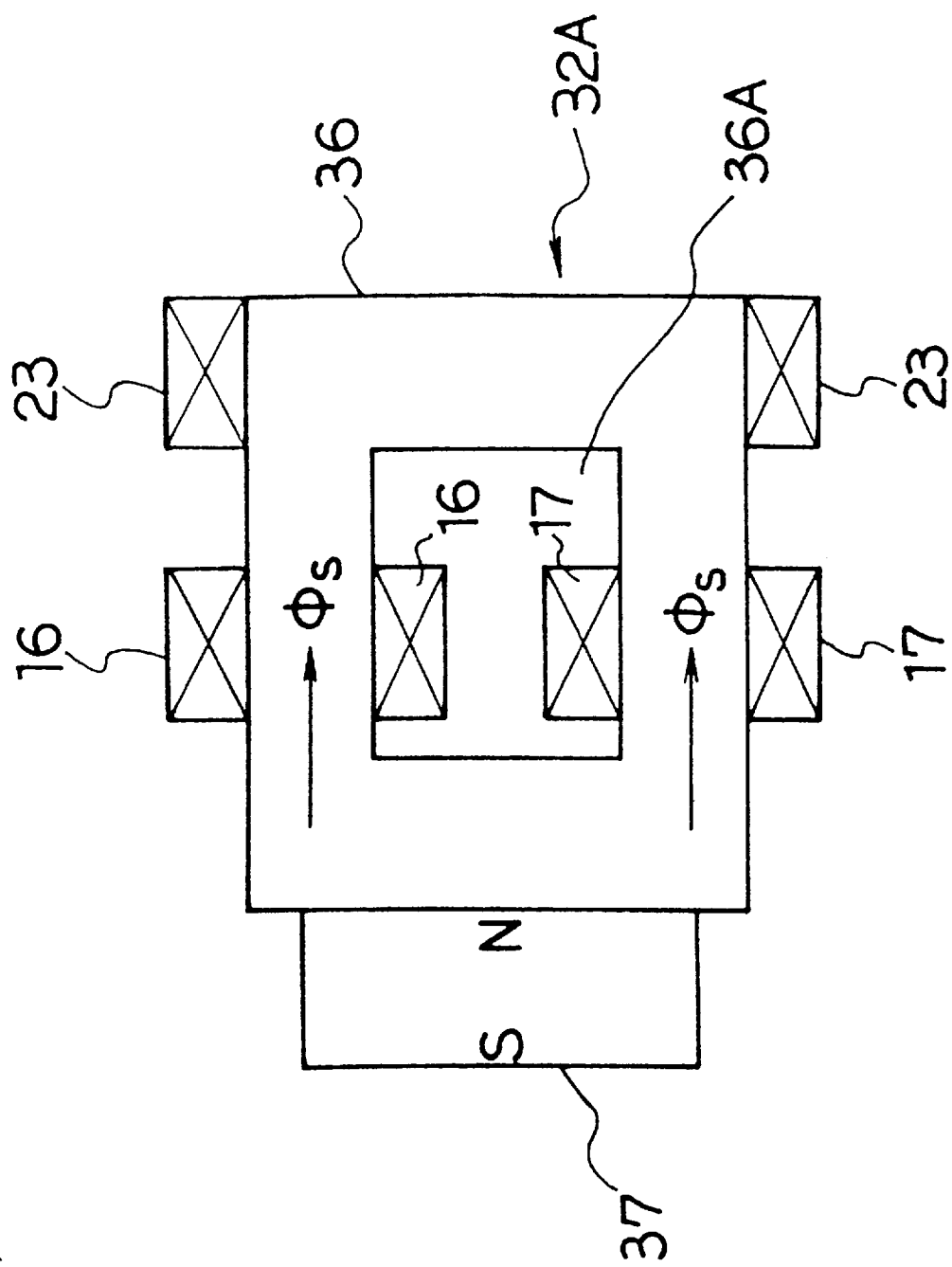
FIG. 11 is a cross-sectional view of a saturable reactor in a second embodiment.
Figure 12:
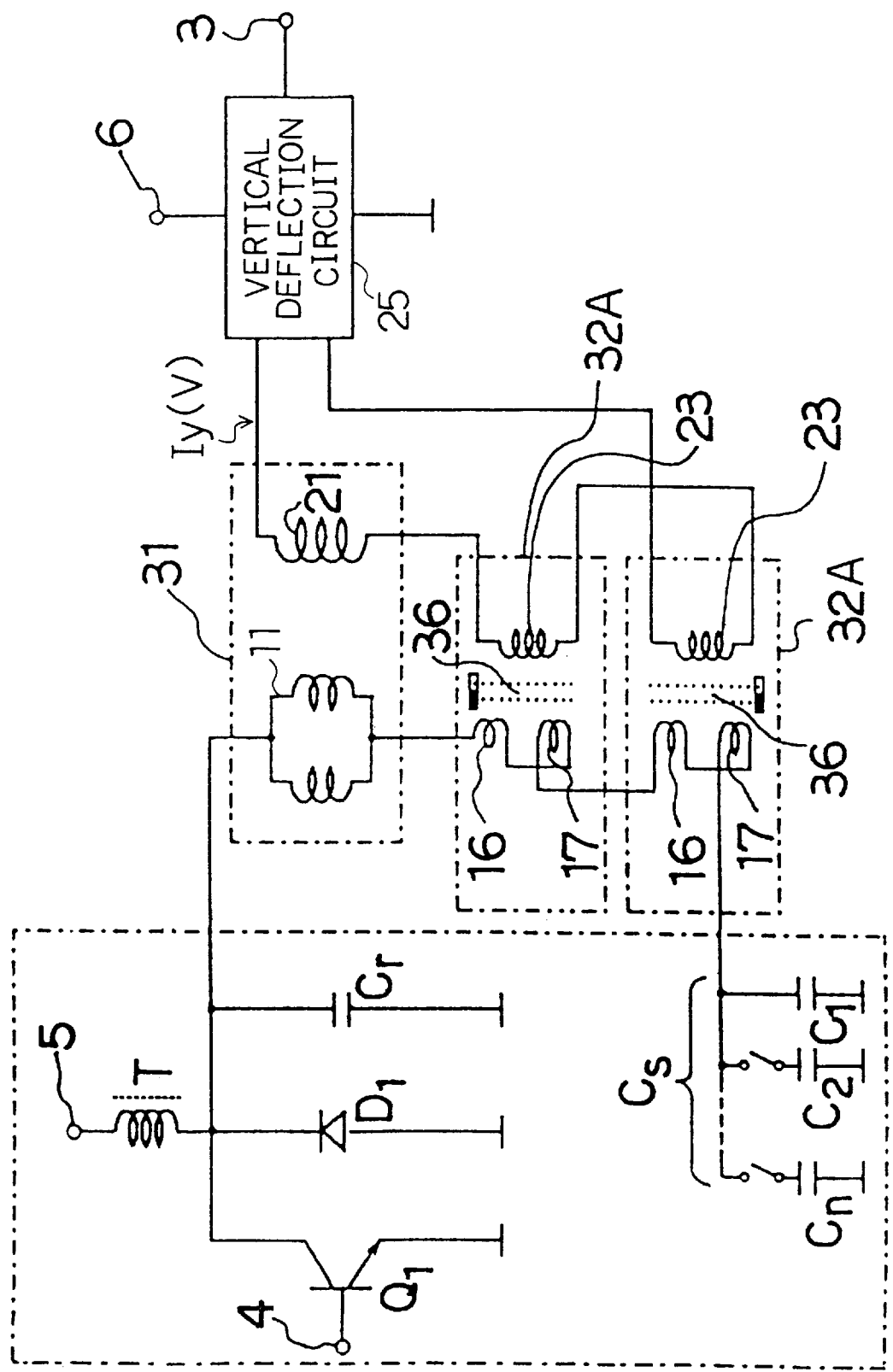
FIG. 12 is a circuit diagram of the deflection circuit comprising two saturable reactors of the second embodiment.
Figure 13:
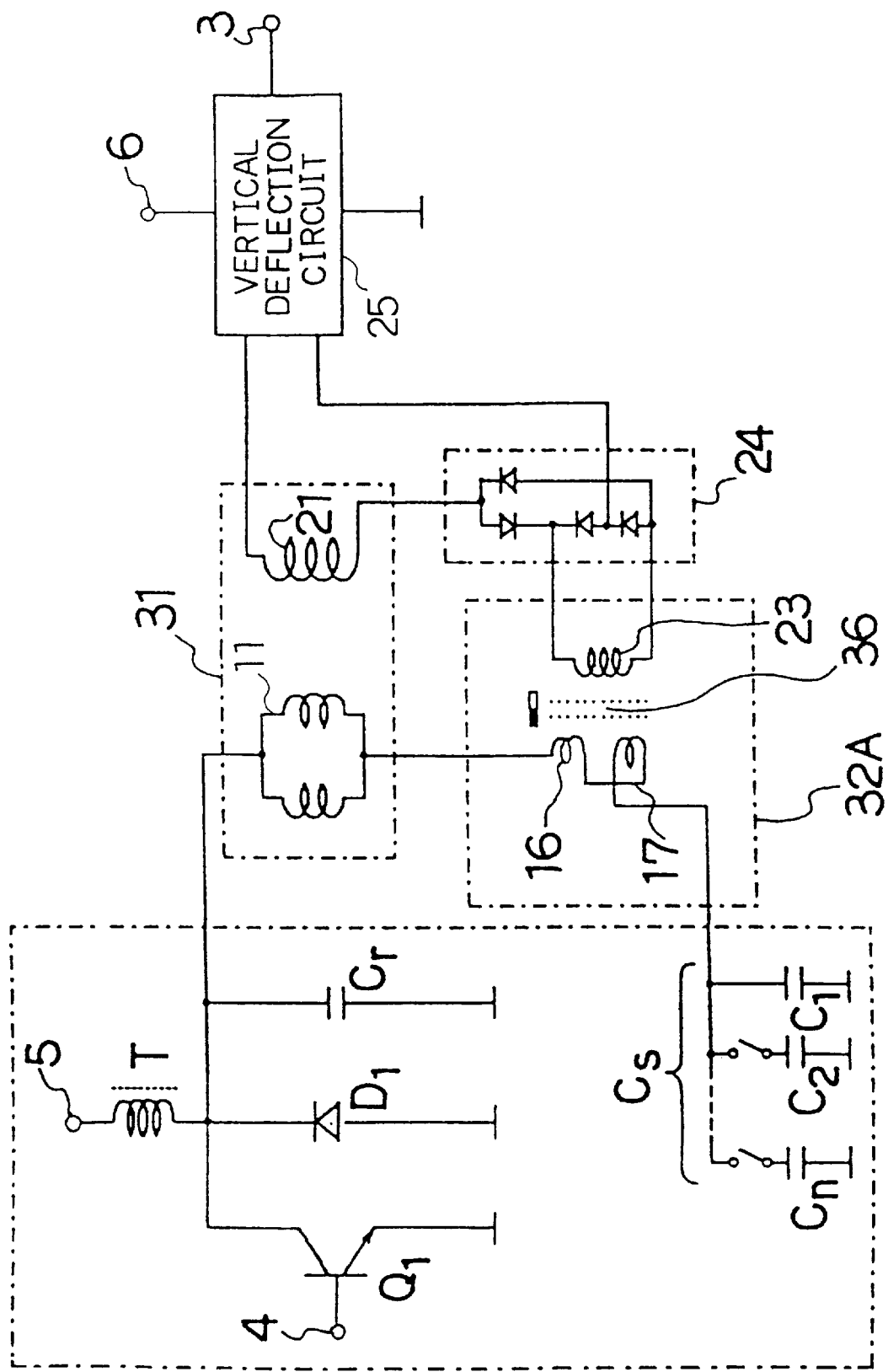
FIG. 13 is a circuit diagram of the deflection circuit comprising one saturable reactor of the second embodiment.
Figure 14:
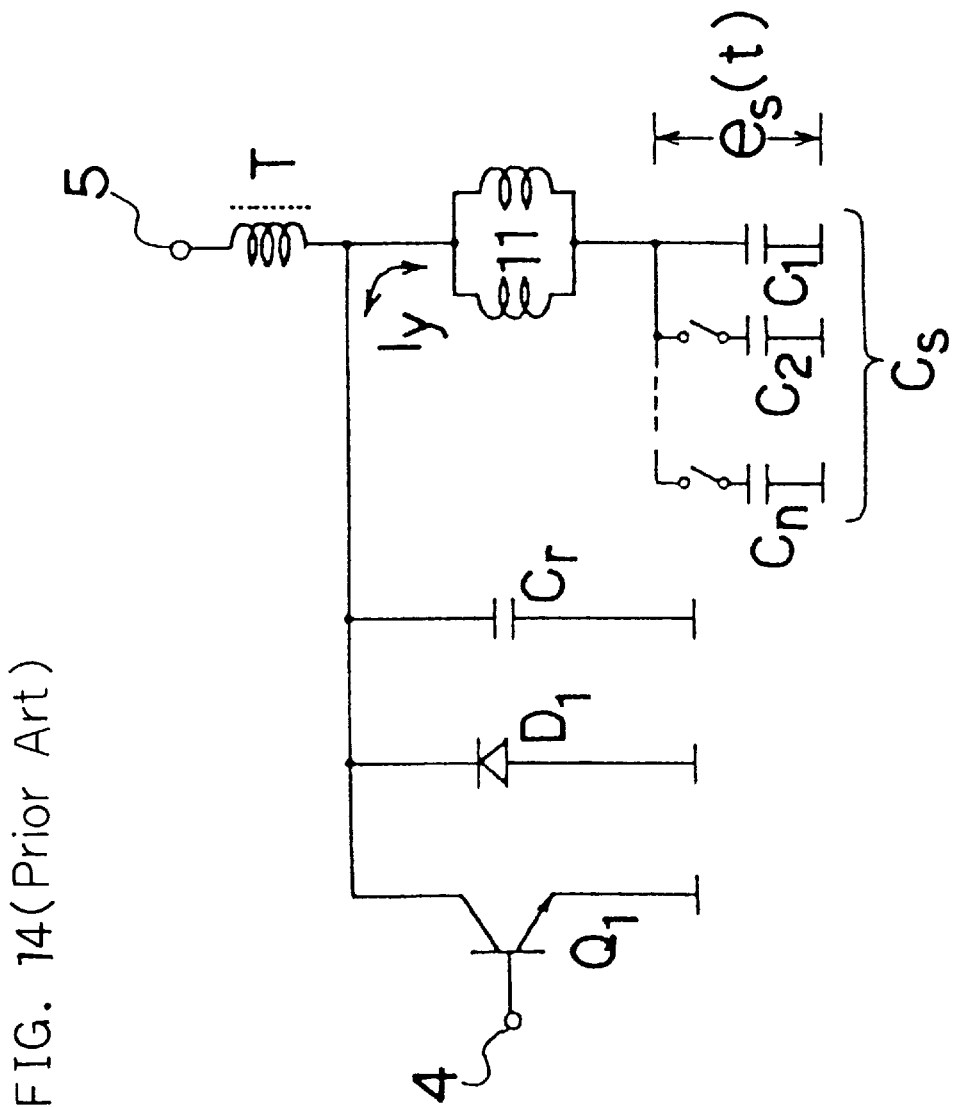
FIG. 14 is the horizontal deflection circuit including the conventional S-distortion correction circuit.
Figure 15:
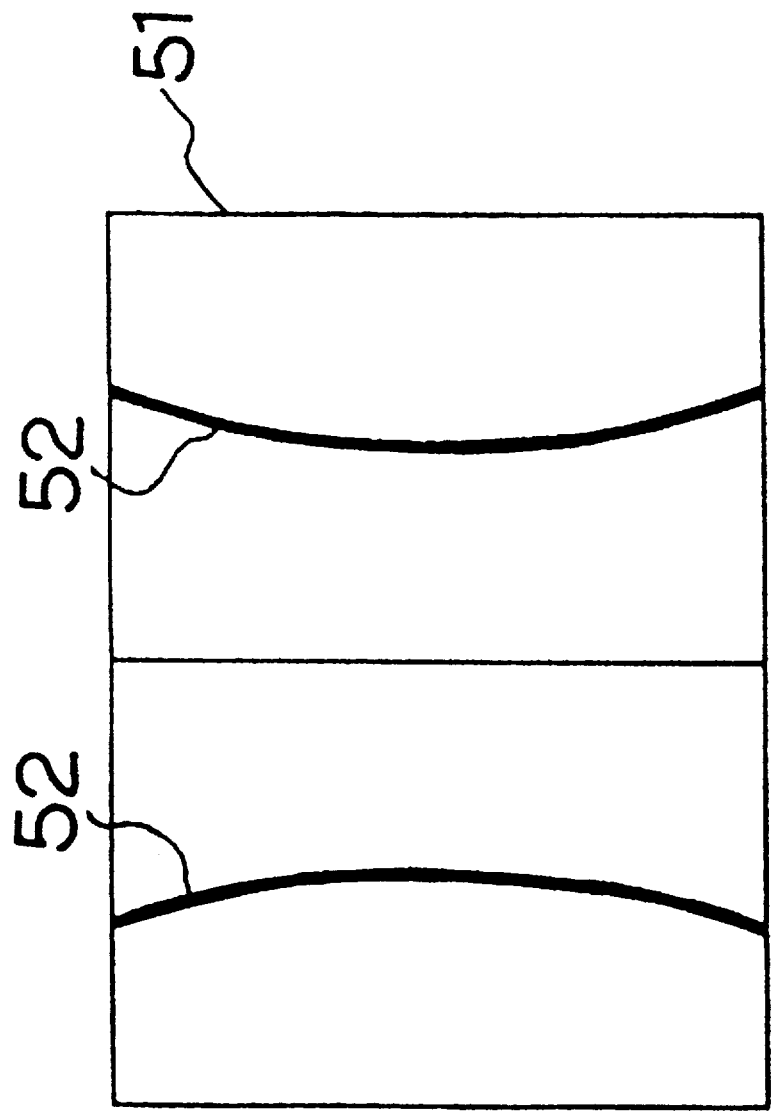
FIG. 15 is a front view of a picture face of a video image display apparatus displaying pictures 52 including pincushion distortion in a central part of the picture face.

A second embodiment of the picture distortion correction apparatus of the present invention is described hereafter with reference FIG. 11 to FIG. 13. FIG. 11 is a cross-sectional view of a saturable reactor 32A in the second embodiment. In FIG. 11, a single permanent magnet 37 which produces fixed magnetic field is attached to a rectangular core 36 having a single window 36A. A first reactor coil 16 and a second reactor coil 17 are wound through the window 36A of the core 36. The first reactor coil 16 is connected in series with the second reactor coil 17 in a manner of inverse polarity. Respective inductances of the reactor coils 16 and 17 are varied by magnetic fields passing through respective parts of the core 36 surrounded by the reactor 16 and 17. A third coil 23 is wound on the circumference of an end part of the core 36. In FIG. 11, the reactor coils 16 and 17 and the coil 23 are shown by the respective cross-sections. The vertical deflection current $I_y(V)$ of saw-tooth waveform in the vertical deflection period flows in through the third coil 23. The saturable reactor 32A in this second embodiment has configuration that the saturable reactor 32 in the first embodiment shown in FIG. 5 is divided into two parts along a central vertical line, and is designed so that the operation and characteristic are substantially similar to those of the saturable reactor 32.

FIG. 12 is an embodiment of a picture distortion correction apparatus using two saturable reactors 32A shown in FIG. 11. In FIG. 12, the coil 23 of the lower saturable reactor 32A is connected in series with the coil 23 of the upper saturable reactor 32A in a manner of inverse polarity. Consequently, operation and effect of the second embodiment is substantially identical with that of the first embodiment.

According to the second embodiment, the configuration of the saturable reactor is simplified. However, the vertical deflection current $I_y(V)$ passes through two coils 23, and Therefore, load of the vertical deflection circuit 25 increases.

FIG. 13 is a circuit diagram of a picture distortion correction apparatus using one saturable reactor 32A shown in FIG. 11. In this example, the saturable reactor 32A serves as the substantially same operation as the saturable reactors shown in FIG. 1 and FIG. 12 by passing a current of parabolic waveform of the vertical period through the third coil 23. A bridge circuit 24 of diodes connected to the coil 23 is a well known circuit wherein the vertical deflection current of the saw-tooth waveform is rectified and the current of parabolic waveform is generated. Other circuit which passes the current of parabolic waveform of the vertical period through the coil 23 can be used as replacement for the bridge circuit 24. Basic operation of the picture distortion correction apparatus shown in FIG. 13 is substantially identical with that of FIG. 12.

In the picture distortion correction apparatus of this second embodiment, the first and second reactor coils 16 and 17 and the third coil 23 of the saturable reactor 32A are connected in series with the horizontal deflection coil 11 and the vertical deflection coil 21 of the deflection yoke 31, respectively, and therefore similarly to the first embodiment no other connection than the above connections is necessary. Therefore, the picture distortion correction circuit of the second embodiment can be easily incorporated into the conventional deflection circuit. Moreover, the configuration of the saturable reactor 32A is simplified, and therefore easily fabricated, and a fabrication cost is reduced.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A picture distortion correction apparatus for correcting inner pincushion distortion in a vertical direction on a picture face, the picture face having upper and lower parts in the vertical direction, a central part, and two opposing end parts in the horizontal direction, the apparatus comprising:

a saturable reactor having a first, a second, a third and a fourth reactor coil, each of the coils being wound on a core, and connected in series with each other and in series with a horizontal deflection coil to pass a horizontal deflection current, a fifth coil wound on said core, and connected in series with a vertical deflection coil to pass a vertical deflection current, at least one permanent magnet attached to said core to generate a magnetic bias field applied to said first and second reactor coils in a first direction, and to said third and fourth reactor coils in a second direction opposite to said first direction, wherein a sum of respective inductances of said first, second, third and fourth reactor coils in the upper and lower parts of the picture face, increases in a central part of the horizontal scanning and decreases toward both end parts of the horizontal scanning, wherein the sum of respective inductances of said first, second, third and fourth reactor coils in the central part of vertical direction of the picture face decreases in the central part of the horizontal scanning and increases toward both the end parts of the horizontal scanning, and wherein the sum of respective inductance of said first, second, third and fourth reactor coils generally increases in both end parts of vertical scanning, and generally decreases in the central part of the vertical scanning.

2. The picture distortion correction apparatus of claim 1, further comprising a correction capacitor connected in series with said saturable reactor.

3. The picture distortion correction apparatus of claim 1, wherein the at least one permanent magnet comprises a pair of permanent magnets symmetrically arranged with respect to said first, second, third and fourth reactor coils on both ends of said core, such that the absolute values of respective magnetic bias fields caused by said permanent magnets are equal to each other, and in upward or downward deflection on said picture face, the absolute value of the magnetic bias field caused by said coil is smaller than the absolute value of the magnetic bias field caused by each permanent magnet.

4. The picture distortion correction apparatus of claim 1, wherein the absolute values of respective magnetic bias fields caused by said first to fourth reactor coils are equal to each other, and wherein in upward deflection on said picture face, the absolute value of the magnetic bias field caused by said coil is larger than the absolute values of the magnetic bias fields caused by said first to fourth reactor coils, and is smaller than the absolute values of the magnetic bias fields caused by said at least one permanent magnet.

5. The picture distortion correction apparatus of claim 1, wherein said first reactor coil and said second reactor coil are connected in series in inverse polarity with each other so that waveform change of said first reactor coil caused by change of said horizontal deflection current is in inverse polarity to waveform change of said second reactor coil caused by the change of said horizontal deflection current, and said third reactor coil and said fourth reactor coil are connected in series in inverse polarity with each other so that waveform change of said third reactor coil caused by change of said horizontal deflection current is in inverse polarity to waveform change of said fourth reactor coil caused by the change of said horizontal deflection current.

6. A picture distortion correction apparatus for correcting inner pincushion distortion in a vertical direction on a picture face, the picture face having upper and lower parts in the vertical direction, a central part, and two opposing end parts in the horizontal direction, the apparatus comprising:

at least one saturable reactor having a first reactor coil and a second reactor coil wound on a core, and connected in series with each other and connected in series with a horizontal deflection coil to pass a horizontal deflection current, a third coil wound on said core, and connected in series with a vertical deflection coil for transmitting a vertical deflection current, a permanent magnet attached to said core to apply a magnetic bias field to said first reactor coil and said second reactor coil, wherein a sum of respective inductance of said first and second reactor coils in a horizontal scanning on an upper part and a lower part of a picture face increases in a central part in the horizontal direction, and decreases toward both end parts in the horizontal direction, wherein the sum of respective inductance in the horizontal scanning in the central part in the vertical direction of the picture face decreases in the central part in the horizontal direction, and increases toward both end parts in the horizontal direction, and wherein the sum of respective inductance generally increases in both end parts of the vertical scanning, and generally decreases in the central part of the vertical scanning.

7. The picture distortion correction apparatus of claim 6, wherein in upward deflection on said picture face, the absolute value of the magnetic field caused by said third coil is larger than the absolute values of the magnetic fields caused by said reactor coils and is smaller than the absolute values of the magnetic bias fields caused by said permanent magnet.

8. A picture distortion correction apparatus for correcting inner pincushion distortion in a vertical direction comprising:

(a) reactor coils connected in series in inverse polarity, the reactor coils taken together having a characteristic curve representing an inductance thereof, the characteristic curve including an upwardly convex portion and a downwardly convex portion; and (b) a horizontal deflection coil, wherein the reactor coils and the horizontal deflection coil are connected in series to pass a horizontal deflection current, and the upwardly convex portion and the downwardly convex portion of the characteristic curve are selectively utilized to adjust a horizontal deflection amount corresponding to a vertical deflection amount to correct pincushion distortion in the vertical direction.

9. A picture distortion correction apparatus for correcting inner pincushion distortion in a vertical direction comprising:

at least one pair of magnetically coupled reactor coils connected in series with each other and in series with a horizontal deflection coil to pass a horizontal deflection current;

a coil magnetically coupled to said reactor coils, and connected in series with a vertical deflection coil to pass a vertical deflection current; and magnetic field producing means for applying a magnetic bias field to said reactor coils and said coil, wherein said reactor coils are connected so that said magnetic bias field is applied to said respective reactor coils in opposing directions, wherein an intensity of said magnetic bias field applied to said reactor coils is varied by the magnetic field caused by said coil, thereby controlling respective inductance of said reactor coils such that the inner pincushion distortion in the vertical direction is corrected on the basis of the sum of the respective inductance of said reactor coils.

10. The picture distortion correction apparatus of claim 9, wherein in upward deflection on said picture face, the absolute value of the magnetic field caused by said coil is larger than the absolute values of the magnetic fields caused by said reactor coils, and smaller than the absolute values of the magnetic bias fields caused by said magnetic field producing means.

11. A picture distortion correction apparatus for correcting inner pin cushion distortion comprising:

first, second, third, and fourth reactor coils connected in series with each other and in series with a horizontal deflection coil;

a fifth coil connected in series with a vertical deflection coil;

a generally rectangular core having a first window and a second window, wherein the first and second coils are wound on opposing sides of the core though the first window, the third and fourth coils are wound on opposing sides of the core through the second window, and the fifth coil is wound around the core between the first and second windows; and a pair of permanent magnets for applying a generally constant magnet bias to the first, second, third and fourth reactor coils.

12. The picture distortion correction apparatus of claim 11, further comprising a correction capacitor connected in series with the fourth reactor coil.

* * * * *

UNITED STATES PATENT AND TRADEMARK OFFICE
CERTIFICATE OF CORRECTION

PATENT NO. : 5,804,928　　　　　　　　　　　　　　　　　　　　　　　　Page 1 of 1
DATED : September 8, 1998
INVENTOR(S) : Morio Endo It is certified that error appears in the above-identified patent and that said Letters Patent is hereby corrected as shown below:

Column 14,
Line 42, please change "though" to -- through --.

Signed and Sealed this

Twenty-fifth Day of September, 2001

*Attest:*

*Nicholas P. Godici*

*Attesting Officer*　　　　　NICHOLAS P. GODICI
　　　　　　　　　　　　　*Acting Director of the United States Patent and Trademark Office*